US006719552B1

United States Patent
Golden

(10) Patent No.: US 6,719,552 B1
(45) Date of Patent: Apr. 13, 2004

(54) APPARATUS FOR FORMING ROLLED LIPS ON THERMOPLASTIC CONTAINERS

(75) Inventor: Randy Golden, Ada, OK (US)

(73) Assignee: Solo Cup Company, Highland Park, IL (US)

( * ) Notice: Subject to any disclaimer, the term of this patent is extended or adjusted under 35 U.S.C. 154(b) by 241 days.

(21) Appl. No.: 09/966,996

(22) Filed: Sep. 28, 2001

(51) Int. Cl.[7] .................................................. B29C 53/34
(52) U.S. Cl. ........................ 425/171; 425/392; 425/329; 264/297.4
(58) Field of Search .................................. 425/171, 138, 425/392, 384, 329; 264/297.4

(56) References Cited

U.S. PATENT DOCUMENTS

| 3,363,283 A | * | 1/1968 | Weber | 425/329 |
| 3,914,102 A | * | 10/1975 | Brown | 425/392 |
| 4,235,579 A | | 11/1980 | Kurz et al. | 425/174.4 |
| 4,391,768 A | | 7/1983 | Arends et al. | 425/384 |
| 5,118,277 A | | 6/1992 | Padovani | 425/384 |
| 6,093,010 A | | 7/2000 | Lamson | 425/188 |
| 6,129,537 A | | 10/2000 | Merz | 425/193 |
| 6,135,754 A | | 10/2000 | Lamson | 425/392 |
| 6,135,756 A | * | 10/2000 | Arends | 425/398 |
| 6,164,949 A | | 12/2000 | Lamson | 425/329 |

* cited by examiner

Primary Examiner—Robert Davis
Assistant Examiner—Thu Khanh T. Nguyen
(74) Attorney, Agent, or Firm—Wallenstein Wagner & Rockey, Ltd.

(57) ABSTRACT

A lip rolling apparatus for open-mouthed stacked thermoplastic containers is disclosed. One particular apparatus includes components for presenting a nested stack of containers having unrolled lips to a rim roller, engaging individual cups on a screw assembly, heating a supply of air in a heater to a desired temperature, discharging the supply of heated air toward the containers as they are engaged on the screw assembly, and rolling the lips of the containers in the screw assembly. The present invention may be designed to prevent the screw assembly from operating until the supply of air reaches the desired temperature. Additionally, the heater (e.g., a forced air heater) may be moved between an initial position proximate the nested stack of containers and a safety position in response to a signal. Such a signal may be generated in response to a temperature sensor, system error, or any other such triggering episode.

20 Claims, 3 Drawing Sheets

APPARATUS FOR FORMING ROLLED LIPS ON THERMOPLASTIC CONTAINERS

TECHNICAL FIELD

The present invention relates to a lip rolling machine for forming lips on thermoplastic containers, such as disposable cups, food packages, etc.

BACKGROUND OF THE INVENTION

Lip-rolling machines are used to produce a rolled rim on plastic containers. After trimming of the container from a thermoplastic sheet, the open end of the container has a rather sharp edge with an outward flare. The reason for rolling this edge is at least two-fold. First, drinking from a cup made in this fashion is a less than suitable undertaking for the user. Second, it is difficult to manufacture a lid which will fit about the flared edge and still maintain a suitable seal against the container rim.

Conventional lip rolling machines utilize an open ended, clam-shell type electric heating oven to heat and form lips on horizontally-nested thermoplastic containers, such as cups, as they are advanced off a production line. U.S. Pat. No. 6,093,010, issued Jul. 25, 2000, to Lamson, discloses a typical thermoforming process, including a clam shell oven. The oven often generates heat to cause internal surface temperatures of the oven to reach in excess of 500° F. with the heaters themselves getting up to 1200° F. However, when the production line is stopped-due, for example, to a thermoforming machine malfunction—a length of cups remain in the hot open oven. If this length of cups (approximately two feet of nested cups) is not removed from the oven when the line is stopped, these cups may catch fire or melt. Moreover, the line uses guide rails to stabilize the cups within the oven, but because of the extreme heat generated by the open-ended oven, it is necessary to run cooling water through the guide rails to keep the rails from overheating. This requirement adds to the expense and complexity of the machinery. Traditional lip rolling machines induce large amounts of heat into the open oven, and thus, utilize large amounts of energy.

Typically, lip rolling machines guide the cups along water rails up to a lip rolling screw assembly, within the clamshell oven, with the top open and the oven hot Once the cups engage the screw(s), the oven lid is closed and the rim rolling process begins. As a result, a length of cups equal to or greater than the distance between a crowd roller assembly and the lip rolling screw assembly must be removed and discarded due to the insufficiency of heat applied to the cups from the oven being open and the lack of pressure applied by the crowd rollers.

The present invention is provided to solve these and other such problems with prior art devices.

SUMMARY OF THE INVENTION

The present invention provides a lip rolling system for rolling lips about the open mouths of stacked thermoplastic containers can generally be described as comprising a supply line of nested thermoplastic containers, a screw assembly positioned to receive the nested thermoplastic containers, a mechanism for directing the nested thermoplastic containers toward the screw assembly, and a heat source having an initial position to direct a supply of heated air at the containers as they are engaged by the screw assembly.

It is an aspect of the disclosed system that the heat source may be removed from the initial position to a safety position automatically in response to a signal. Such a signal may be generated in response to a temperature sensor, system error, or any other such triggering episode.

Finally, an embodiment of the disclosed heating system for a lip rolling machine generally comprises a heat source set at an initial position and having a housing with an open exit end directed toward a container area, an air source coupled to the heat source, and wherein a supply of air from the air source is communicated to the heat source and heated to a temperature before being discharged from the exit end toward the container area.

Other features and advantages of the invention will be apparent from the following specification taken in conjunction with the following drawings.

BRIEF DESCRIPTION OF THE DRAWINGS

In order to better describe the features of the present invention, a number of drawing figures are appended hereto in which.

DETAILED DESCRIPTION OF THE PREFERRED EMBODIMENT

Figure 1:
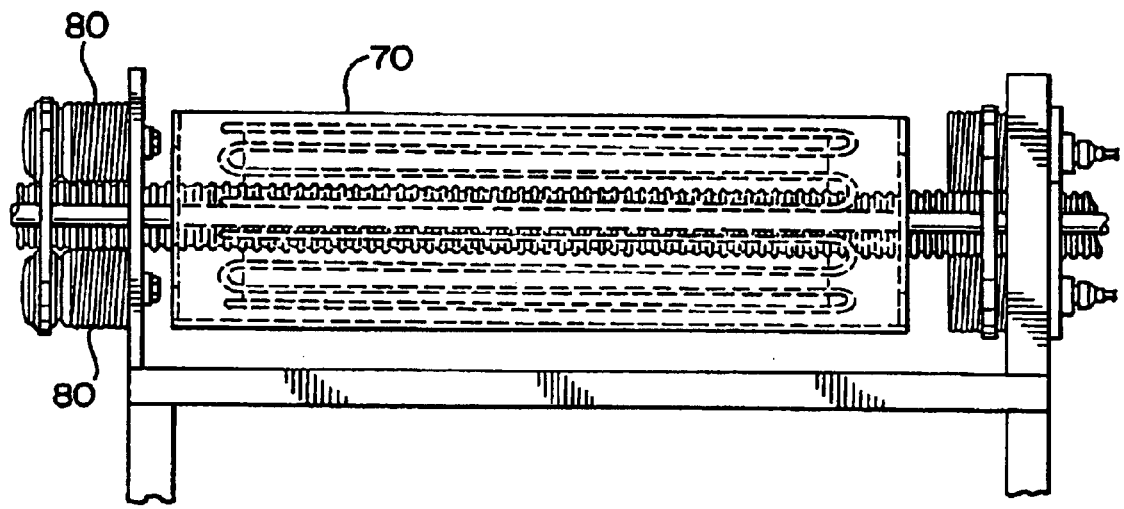
FIG. 1 is an elevated side view of the prior art system, including a clamshell oven in the closed position.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Referring generally to the appended FIGS. 1–6, the process of rolling the lip of a container, such as a drinking cup, using the present invention can be more readily understood. The disclosed lip rolling system, or lip roller, is generally referenced by the number "10" in the following disclosure and drawings. Other components are similarly and consistently numbered throughout the specification and drawings. While the present invention is particularly designed for use with thermoplastic containers, such as, for example, drinking cups, souffle cups, food containers, and the like, manufactured by the SOLO CUP COMPANY of Highland Park, Ill., other such thermoplastic containers and manufacturing equipment may be capable of adaptation for implementation of the system as well.

Figure 2:
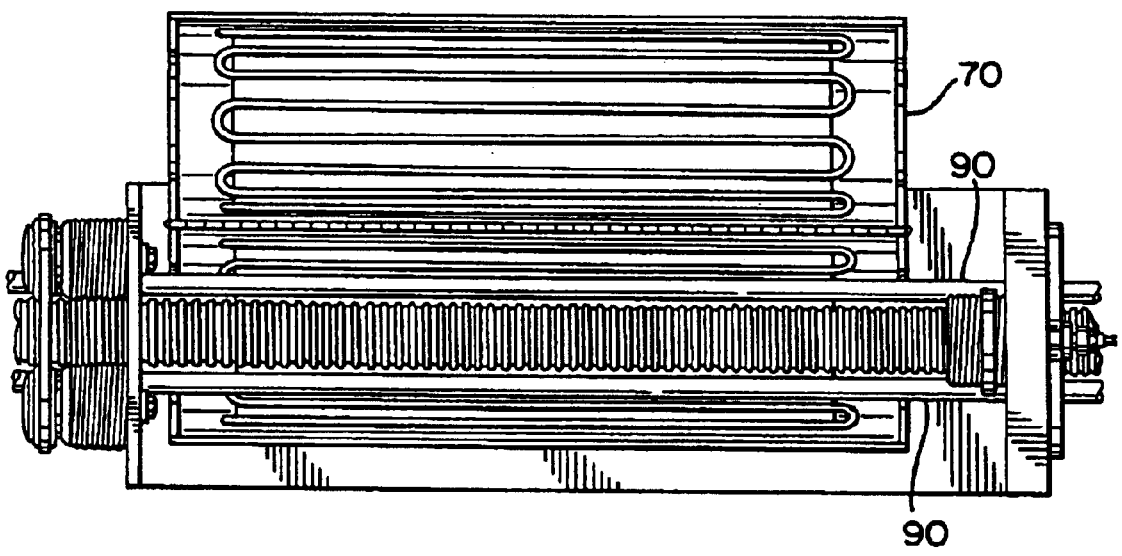
FIG. 2 is a top view of the prior art system of FIG. 1, showing the clamshell oven in an open position.

As shown in FIG. 2, one embodiment of the present lip rolling system (10) is generally aligned with a supply of nested, stacked thermoplastic containers (C) produced by any of the known manufacturing techniques leaving the containers with an unfinished rim edge of a slightly outward lip. A method of rolling the lips of these containers (C) about the open mouths of the stacked thermoplastic containers (C) generally begins with the step of presenting the nested stack of containers (C) having unrolled Lips to a lip roller (10).

As the individual containers proceed along the supply line they are engaged on a screw assembly (12). At the screw assembly (12) a supply of air is heated in a heat source such as a heater (14) to a desired temperature. Preferably, the temperature of an individual container during the lip rolling is within the range of from about 400° to about 1200° F., more preferably within the range of from about 500° to about 600° F. However, the actual temperature of the container rim area will depend on the material thickness.

The supply of heated air is discharged toward the containers (C), particularly the rim of the container, as they are engaged on the screw assembly, and the lips of the containers (C) are then rolled in the screw assembly (12). The rolling process once engaged by the screw assembly (12), generally speaking, is not unlike that known by those skilled in the art. That is, the heated lip is rolled under the rim by engaging the toothed turns of the screw curling (16).

Figure 3:
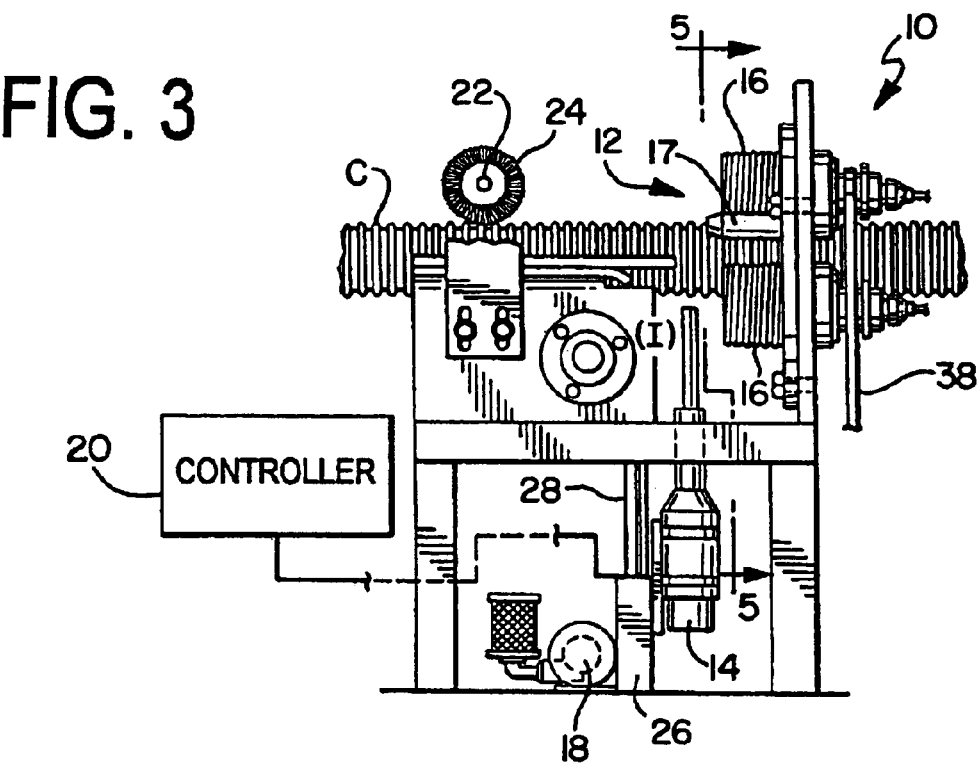
FIG. 3 is an elevated side view of an embodiment of the present invention showing the heat source in an initial position.

Air may be supplied to the heater (14) by an air blower (18), as shown in FIG. 3. Any conventional air blower would likely be acceptable for supplying the necessary air. With respect to the heater (14), a 6 Kw (480 volt) 3-phase heater is presently used, manufactured by Sylvania Osram (Model No. 072772). Suitable replacements heat sources are known by those skilled in the art.

The screw assembly (12) may be prevented from operating until the supply of air reaches the desired temperature. This is possible by making the screw assembly (12) responsive to any number of sensors (not shown) monitoring parameters such as temperature, line speed, production errors, or the like, using a controller (20). For example, should a sensor detect the absence of containers in the feed line, the screw assembly could cease operation thereby reducing wear-and-tear on the system. The present embodiment utilizes a 480 volt (30 amp) 3-phase controller manufactured by Avatar (Model No. A3P48-30).

Figure 5:
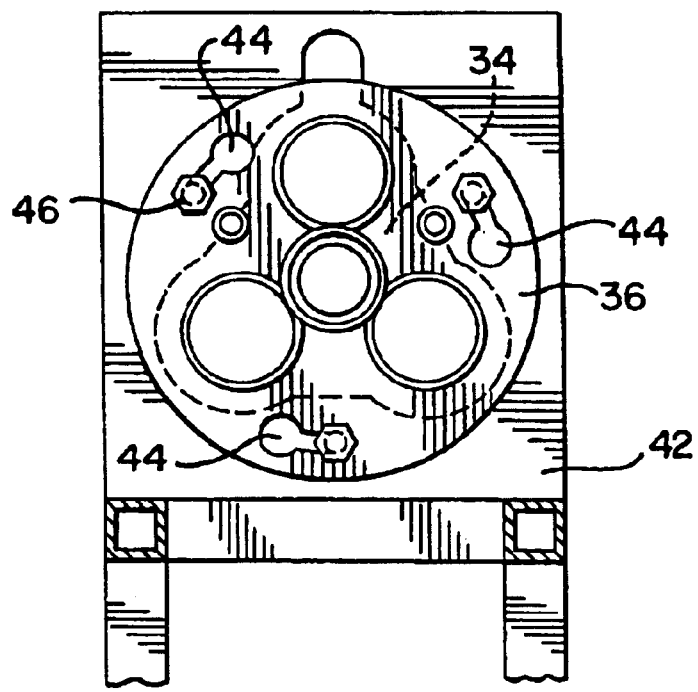
FIG. 5 is a front view taken along line 5—5 of FIG. 3 showing one embodiment of a screw assembly of the present invention mounted upon a frame.

Typically, the screw assembly (12) will include a plurality of screw curlings (16), as many as five, but may be a single screw curling (16) for some operations. Three equidistantly spaced screw curlings (16) is the preferred arrangement, as shown in FIG. 5. In contrast to the prior art, the screw curlings (16) used in the present invention are substantially shorter (i.e., less turns or teeth). This is possible because of the concentrated heat to the containers. The shorter screw curlings are less rough on the containers as they roll the respective lips of each.

Figure 4:
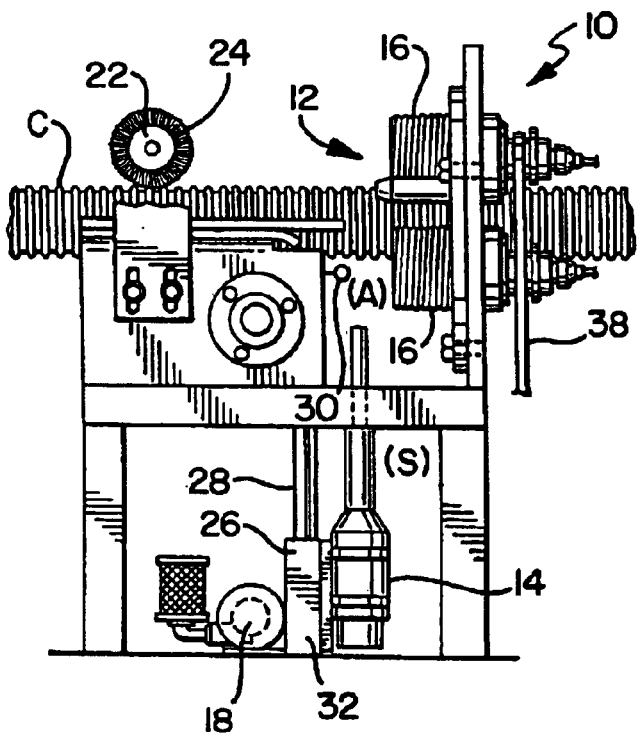
FIG. 4 is an elevated side view of the embodiment of the present invention shown in FIG. 3 showing the heat source in a safety position.

In order to direct the nested stack of containers (C) to the screw assembly (12), a crowd brush (22) is used in the present embodiment. The crowd brush (22), as shown in FIGS. 3 and 4, turns such that the extending nylon bristles (24) contact the containers and impart lateral motion to the individual containers keeping them fully nested together.

As the containers (C) encounter the screw curlings (16) a heat source (14), such as a forced air heater, discharges a supply of heated air at the containers in the container area (A) proximate the screw curlings (16). The concentrated air supply is preferably directed at the container rim.

The concentrated heat at the screw assembly (12) provides a number of benefits in the present invention. First, it allows the use of thinner material at the container rim. Potentially, as much as a 50% reduction in material thickness at the rim, or within the range of from about 0.030 to about 0.015 inches on a small cup—the thickness, being a function of the cup size, will increase accordingly. Such thin materialed containers used on prior art lip rolling devices which heat the container for a longer duration in a clamshell oven (70), as shown in FIGS. 1 and 2, would either experience a greater incident of rim flares—where the rim is distorted from the heat to become thicker and shorter, making proper lip rolling difficult—or may be crushed by the crowd rollers (80)—used to compress and rotate the stack of containers. In the present invention, heat is applied while the container is in contact with the screw curling (16) to prevent flaring.

Second, the concentrated heat supply allows heating to be limited to the rim area of the container. Prior art devices would heat the entire container, which could result in an unstable container base, as well as system components, such as guide rails (90). To offset such indiscriminate and extensive heating, water is run through the guide rails (90) used within the clamshell oven (70). The present invention avoids the added complexity of these water-filled guide rails.

Another benefit of the concentrated heat supply relates to spinning of the container. Turning the container is the only way to provide even heating in the prior art clamshell oven (70). Crowd rollers (80) positioned at the entrance of prior art ovens (and friction) are used to spin the containers, adding more to the complexity of the prior art. Further, because the duration for each cup within the oven is substantial, the friction-induced spinning leaves a "contact line" on the outer surface of each nested container. The line can be a detraction from the container's aesthetics. By contrast, the present invention needs no crowd rollers and utilizes the screw curling (16) to turn individual containers while each is being heated. The duration of spinning for each container is significantly reduced, eliminating the occurrence of the "contact line" on the outer surface.

As a safety measure—one not present in the prior art—the heater (14) is preferably attached or otherwise affixed to a reciprocating mechanism (26). Such a mechanism (26), a pneumatic, electric, or hydraulic cylinder, for example, would allow the heater (14) to be moved to any number of positions along a shaft or rod (28). One such position would be proximate the nested stack of containers, as shown in FIG. 3. This position could be achieved in response to the supply of air reaching the desired temperature for lip rolling, as discussed above.

In the event of a malfunction or production stoppage, the heater (14) could be moved to a position distant from the nested stack of containers. Immediately the source of heat is removed from the thermoplastic containers, greatly reducing the frequency of melted containers and, in severe cases, fire. Both are common occurrences with the clamshell arrangement.

The step of moving the heater (14) to and from a position proximate to the nested stack of containers (C) can be accomplished by a variety of means. As mentioned above, by mounting the heater (14) to a movable mechanism (e.g., a cylinder or the like), actuation of the mechanism can be used to appropriately place the heater (14). Basically, there are two positions: an initial position (I) proximate the stack of containers (C) and a safety position (S) away from the stack of containers (C).

Actuation of the heater (14)—i.e., movement to and from either of the two positions (1) or (S)—can be triggered by a temperature reading, an operation condition (e.g., production stoppage), operator override, or the like. Sensors, or other known devices, may be placed about the present invention to detect the desired condition. For example, a temperature sensor (30) may be used to detect a temperature threshold of the heated air expelled from the heater (14). A temperature outside a desired range would result in the actuation of the cylinder (32) in response to a signal generated in response to the sensor (30) moving the heater (14) to the safety position (S), as shown in FIG. 4. Those skilled in the art will be able to understand this concept and readily apply it more generally for other sensing or measurement devices.

Alternatively, or in addition to the actuation of the heater (14) for safety, it is possible to provide a mechanism for deflecting or diverting the supply of heated air from the containers (C) in response to similar signals. One such means for diverting the supply of heated air may include an adjustable plenum, a close-able duct, a deflection plate, or the like.

Referring again to FIG. 3, the lip rolling system (10) is initially fed containers from a supply line of nested thermoplastic containers (C), which move in a direction toward the screw assembly (12) positioned to receive the nested thermoplastic containers. In the presently preferred embodiment, a mechanism for directing the nested thermoplastic containers toward the screw assembly is used to assist the movement of the containers. A bristled crowd brush (22) is effective for this purpose. However, it is anticipated that other known mechanisms, such as an air jet aimed at the container rim or other area, could be used for this movement as well. Gravity may also be used, either alone or in combination with other mechanisms, by inclining the container feel line. From this disclosure, those skilled in the art would understand and be able in implement other such mechanical and functional equivalent devices without undue experimentation.

With reference to FIG. 4, as part of the screw assembly (12) stabilizers in the form of chrome rollers (17) are preferably positioned adjacent the screw curlings (16). The chrome rollers (17) help turn the containers as they enter the screw assembly (12) and help maintain the round shape of the container as well. This is especially true for screw assemblies utilizing a single screw curling (16).

Figure 6:
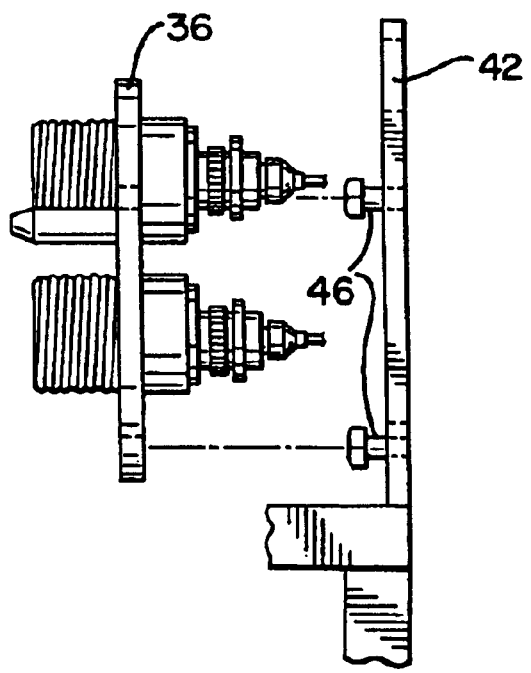
FIG. 6 is an elevated side view of the assembly of FIG. 5 as it may be preferably removed from the frame.

The screw curlings (16) and the chrome rollers (17) are positionally fixed about an opening (34) through which the containers are passed as their lips are rolled. That is,-the curlings (16) and rollers (17) are preferably not adjustable for different container sizes. Rather, the curlings (16) and rollers (17) are fixed to a plate (36), as illustrated in FIG. 6. Change-over is a tool-less procedure requiring the release of tension on the belt (38) (FIG. 4) driving the screw curlings (16)an air cylinder (not shown) is preferably used with a release valve for quick tool-less release-and removal of the belt (38). The plate (36), as shown in FIG. 5, is attached to a frame (42) through integral key-hole slots (44) and can be lifted off shoulder bolts (46) attached to the frame (42) and the stored for future use, if possible. To replace, the plate (36) having affixed curlings (16) and rollers (17) accurately arranged for a specific container size can be placed onto the shoulder bolts (46) of the frame (42) by integral key-hole slots (44). The belt (38) can then be replaced and tensioned appropriately.

While the specific embodiment has been illustrated and described, numerous modifications come to mind without significantly departing from the spirit of the invention, and the scope of protection is only limited by the scope of the accompanying claims.

I claim:

1. A lip rolling system for rolling lips about the open mouths of stacked thermoplastic containers, the system comprising:
   a supply line of nested thermoplastic containers;
   a screw assembly positioned to receive the nested thermoplastic containers;
   a mechanism for directing the nested thermoplastic containers toward the screw assembly; and
   a heat source having an initial position to direct a supply of heated air at the containers as they are engaged by the screw assembly, wherein the heat source is automatically moved from the initial position to a safety position in response to a signal.

2. The lip rolling system of claim 1, wherein the screw assembly is removable.

3. The lip rolling system of claim 1, wherein the screw assembly is affixed to a removable plate.

4. The lip rolling system of claim 3, wherein the screw assembly comprises at least one screw curling.

5. The lip rolling system of claim 4, wherein the screw assembly further comprises at least one chrome roller.

6. The lip rolling system of claim 1, wherein the screw assembly is permanently affixed to a plate in an arrangement specific to a single container size.

7. The lip rolling system of claim 1, wherein the signal is generated in response to a temperature sensor.

8. The lip rolling system of claim 1, wherein the signal is generated in response to a system error.

9. The lip rolling system of claim 1, further comprising a mechanism for diverting the supply of heated air from the containers.

10. The lip rolling system of claim 9, wherein the mechanism for diverting the supply of heated air comprises an adjustable plenum.

11. The lip rolling system of claim 9, wherein the mechanism for diverting the supply of heated air comprises a cylinder for removing the heat source from the initial position.

12. The lip rolling system of claim 1, further comprising a reciprocating mechanism attached to the heat source, wherein the reciprocating mechanism moves the heat source between the initial position and the safety position.

13. The lip rolling system of claim 1, further comprising stabilizers positioned adjacent the screw assembly.

14. The lip rolling system of claim 1, wherein the mechanism for directing the nested containers comprises a bristled brush.

15. The lip rolling system of claim 1, wherein the mechanism for directing the nested containers comprises an air jet.

16. The lip rolling system of claim 1, wherein the mechanism for directing the nested containers comprises an inclined surface utilizing gravity feed.

17. The lip rolling system of claim 1, wherein the heated air is at a temperature within the range of from about 400° to about 1,200° F.

18. The lip rolling system of claim 17, wherein the heated air is at a temperature within the range of from about 550° to about 600° F.

19. The lip rolling system of claim 1, wherein the screw assembly comprises from 1 to 5 curling screws.

20. The lip rolling system of claim 19, wherein the curling screws are positionally fixed about an opening through which the containers pass.

* * * * *